United States Patent

[11] 3,602,785

[72] Inventor: Richard Gadeyne
 Boulogne-Billancourt, France
[21] Appl. No.: 811,386
[22] Filed: Mar. 28, 1969
[45] Patented: Aug. 31, 1971
[73] Assignee: L'Air Liquide Societe Anonyme pour l'Etude et l'Exploitation des Procedes Georges Claude
 Paris, France
[32] Priority: Apr. 18, 1968
[33] France
[31] 148,442

[54] APPARATUS FOR CONTROLLING THE SPEED AND TORQUE OF TWO MECHANICALLY LINKED DC ELECTRIC MOTORS
 3 Claims, 1 Drawing Fig.
[52] U.S. Cl. .................................................... 318/72, 318/80, 318/82
[51] Int. Cl. .................................................... H02p 5/50
[50] Field of Search .................................................... 318/51, 57, 66, 68, 59, 69, 72, 80, 82

[56] References Cited
FOREIGN PATENTS
809,882  3/1959  Great Britain ............... 318/66
1,485,740  6/1967  France .........................

Primary Examiner—Oris L. Rader
Assistant Examiner—H. Huberfeld
Attorney—Young and Thompson ABSTRACT: An alternating current source energizes in parallel two motors through a full wave rectifier bridge. The rectifier in one of the branches of the bridge is a controlled rectifier which controls the speed of one of the motors. The other motor is energized through the same rectifiers as the first one and through an isolation diode. The energization of the said other motor is supplemented by a current flowing through another rectifier, serially connected with a resistor.

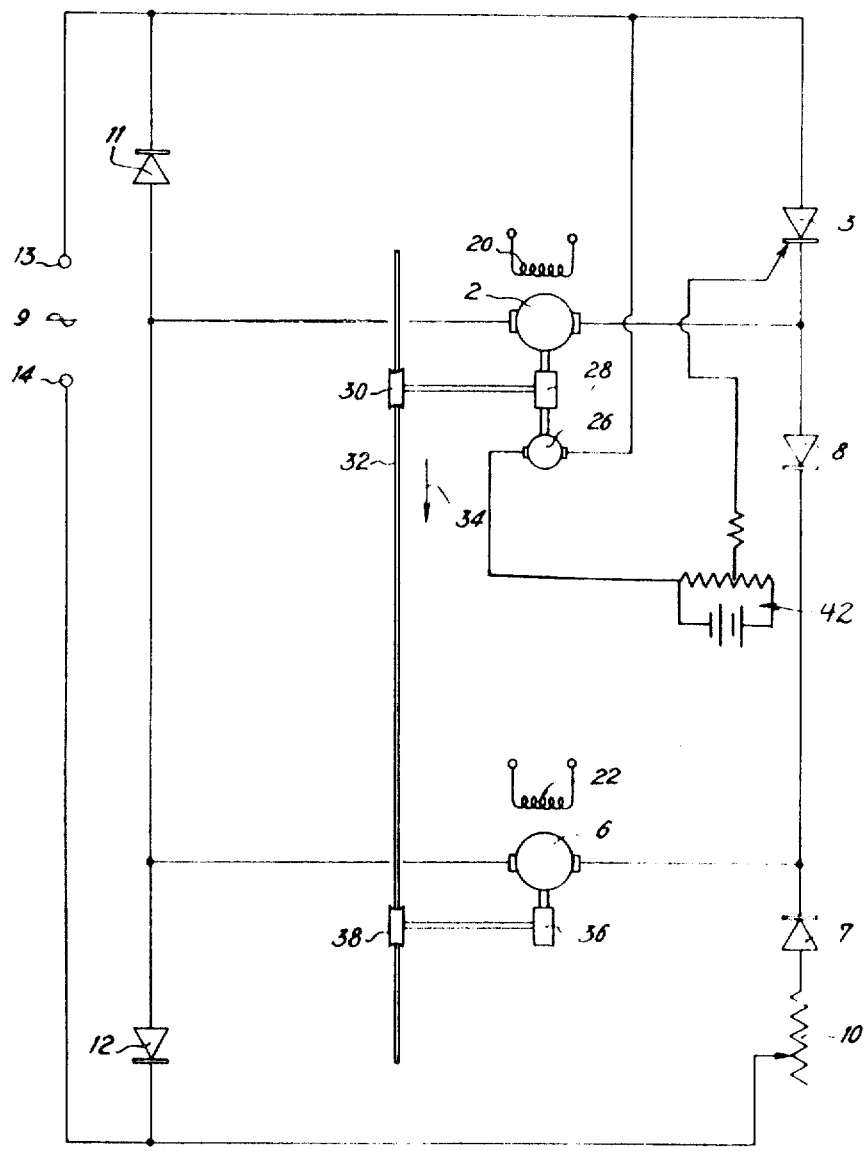

APPARATUS FOR CONTROLLING THE SPEED AND TORQUE OF TWO MECHANICALLY LINKED DC ELECTRIC MOTORS

The device according to this invention is used to adjust, during operation, the torque of one DC-type motor with respect to that of another DC-type motor, both of which are independently excited and are equipped with appropriate reduction gear devices to drive a same element.

This device can be applied, for example, to the two motors feeding the electrode wire in so-called "push-pull" or "relay motor" systems employed in semiautomatic electric arc welding processes using continuous wires: one of the motors pushes the electrode wire through a conduit while the other motor, located at the opposite end of the said conduit, pulls this wire and directs it, either directly or through a second conduit, towards the utilization device. As an example, this assembly uses two DC-type motors which are independently excited. The rotation speed of one motor, called the "main motor," is kept as constant as possible, in accordance with well-known process, by means of a control device such as a regulator although this condition is not absolutely necessary.

Directly energizing both motors in parallel and providing only one regulating device does not, generally, result in satisfactory operation: this arrangement does not permit the correct adjustment of the motor torque ratio during operation. This assembly can then produce pushing or pulling stresses which cannot be tolerated by the driven element, causing for example, excessive buckling of the electrode wire and ineffective use of torques produced by the motors.

The present invention permits easy adjustment, even during operation, of the two motors connected in parallel.

The apparatus according to the invention is of the kind which comprises a pair of DC motors which are energized in parallel by an AC source and which both have drive means to propel a common element. This device comprises the improvement comprising a full-wave rectifying circuit for energizing said motors from said source, said circuit having a branch comprising a conductive component that rectifies and adjusts the means current in one of said motors during the half-cycles when said component is conducting, and an isolation diode which separates the supply connections of the two motors and prevents current from flowing toward the said one motor during the half-cycles when said component is nonconducting.

This apparatus permits controlling simultaneously the speed of both motors and the torque of one motor relative to the torque of the other motor.

A preferred embodiment of the invention is shown as a nonlimiting example, in the accompanying schematical drawing. In this embodiment, one motor pushes a welding wire through a sheath and the other motor pulls the same wire out of the sheath.

The electric motors, of which the torques have to be adjusted, are of the DC, independent excitation, type having excitation windings 20, 22 and armatures respectively identified by reference numbers 2 and 6.

Armature 2 drives a reduction gear unit 28 and a driving roller 30 which, for example, pushes a welding wire 32 in the direction of arrow 34. Armature 6 drives, via a reduction gear unit 36, another driving roller 38 which pulls wire 32 in the same direction.

An AC electrical supply source 9 is connected to a group of two rectifier elements 11 and 12 interconnected in series and in opposition. A first terminal 13 of the source is also connected to a rectifying and adjusting component 3, for instance a controlled diode.

The current in component 3 is controlled by a part sensitive to the speed of armature 2, which may be a known tachometric dynamo 26 connected with a variable source of power 42 to control the conduction duration in component 3 in accordance with the speed of motor 2. This current energizes armature 2 and, through a diode 8, armature 6. The connection between diode 8 and armature 6 is connected to the other terminal 14 of the current source and to diode 12 via a variable resistance 10 and a diode 7 connected in opposition to diode 8. Varying the setting of the tachometric dynamo or the variable power source 42 permits varying the speed of armatures 2 and 6. Such a system is illustrated in FIG. 1 of *Ingenieurs et Techniciens* July-Aug. 1955, page 45.

One terminal of armature 2 is connected to component 3 and diode 8, the other terminal to the connection between rectifier elements 11 and 12. These rectifier elements, diodes 7 and 8 and component 3 are interconnected in such a way that during the half-cycles of one polarity of source 9, current flows from terminal 13 through component 3 and diode 8. Through component 3 it energizes the right-hand terminal of armature 2, and through diode 8 it energizes the right-hand terminal of armature 6. The other terminals of the armatures are energized by terminal 14 via rectifier element 12 during these half-cycles.

During the half-cycles of the other polarity, the right-hand terminal of armature 6 is energized via resistor 10 and diode 7 and the left-hand terminal of both armatures via rectifier 11. The right-hand terminal of armature 2 is not energized, current being blocked by diode 8. The action of motor 6 during these half-cycles is controlled by variable resistor 10. The actions of both motors during the first-named half-cycles are controlled by the tachometric dynamo 26, simultaneously and in the same direction for both motors.

In no-load condition, that is, when there is no wire 32 to be pushed and pulled, if resistor 10 has infinite resistance so that no current can flow through diode 7, armature 6 rotates more slowly than armature 2 due to an unavoidable voltage drop in diode 8 if both motors have the same characteristics.

For the same reason, in the on-load condition, that is, when a wire 32 is to be driven, the peripheral speed of roller 38 tends to be smaller than that of roller 30 when the resistance of resistor 10 is infinite. This tendency to a difference between the speeds tends to compress wire 32 which then tends to buckle.

Changing the setting of resistor 10 permits overcoming this tendency. The less the resistance of the resistor is, the more current will pass through diode 7 during the conducting half-cycles thereof. This current increase gives armature 6 a tendency to turn more quickly, that is, to pull more strongly wire 32, this being true whatever the average current intensity through component 3. This increase of current is effective for armature 6 only as diode 8 prevents current of this direction to pass towards motor 2.

The setting of resistor 10 may be such that both motors act equally upon wire 22. Setting resistor 10 to a lower value makes motor 6 pull the wire more strongly, motor 2 pushing it then less strongly.

Armature 6, which is energized during one of each two half-cycles through diode 8 and receives during the other half-cycle a current which may be varied, may be the one which pushes the welding wire toward the roller energized by armature 2.

The illustrated apparatus may be changed without departing from the present invention. For instance, component 3 may be of the semiconductor type or of the mercury vapor discharge type; it may also be a rectifier in series with a variable resistor. The assembly of component 3 and dynamo 26 may be changed to another rectifying system in which the conduction is controlled by the rotational speed of armature 2. The tachometric dynamo may be changed to a device which senses the voltage at the terminals of armature 2 when component 3 is nonconducting.

The combination of diode 7 and variable resistor 10 may be changed to a controlled rectifier with suitable control means.

I claim:

1. In combination with a pair of DC motors which are energized in parallel by an AC source and which both have drive means to propel a common element, the improvement comprising a full-wave rectifying circuit for energizing said motors from said source, said circuit having a branch comprising a conductive component that rectifies and adjusts the mean current in one of said motors during the half-cycles when said component is conducting, and an isolation diode which separates the supply connections of the two motors and prevents current from flowing toward one said motor during the half-cycles when said component is nonconducting.

2. Apparatus as claimed in claim 1, and a regulating element for adjusting the current flowing through said other motor during the nonconducting half-cycles of said component.

3. Apparatus as claimed in claim 2, in which the current does not flow through said regulating element during the conducting half-cycles of said component.